United States Patent
Belhakimi

(10) Patent No.: US 12,520,027 B1
(45) Date of Patent: Jan. 6, 2026

(54) FRAMING VISUAL CONTENT DURING CAPTURE

(71) Applicant: GoPro, Inc., San Mateo, CA (US)

(72) Inventor: Amine Belhakimi, Paris (FR)

(73) Assignee: GoPro, Inc., San Mateo, CA (US)

( * ) Notice: Subject to any disclaimer, the term of this patent is extended or adjusted under 35 U.S.C. 154(b) by 146 days.

(21) Appl. No.: 18/518,317

(22) Filed: Nov. 22, 2023

(51) Int. Cl.
| | |
|---|---|
| H04N 23/58 | (2023.01) |
| H04N 23/55 | (2023.01) |
| H04N 23/611 | (2023.01) |
| H04N 23/63 | (2023.01) |
| H04N 23/698 | (2023.01) |

(52) U.S. Cl.
CPC ............ *H04N 23/58* (2023.01); *H04N 23/55* (2023.01); *H04N 23/611* (2023.01); *H04N 23/632* (2023.01); *H04N 23/698* (2023.01)

(58) Field of Classification Search
CPC ...... H04N 23/58; H04N 23/55; H04N 23/611; H04N 23/632; H04N 23/698
See application file for complete search history.

(56) References Cited

U.S. PATENT DOCUMENTS

| | | | | |
|---|---|---|---|---|
| 7,483,057 | B2* | 1/2009 | Grosvenor | G06F 3/0304 348/239 |
| 9,076,033 | B1* | 7/2015 | Barron | G06F 3/005 |
| 9,953,216 | B2* | 4/2018 | Alvarez | G06F 3/017 |
| 10,262,691 | B1* | 4/2019 | Gilmour | H04N 7/18 |
| 11,238,901 | B1* | 2/2022 | Lefebvre | H04R 1/02 |
| 2014/0172432 | A1* | 6/2014 | Sendai | G02B 27/0172 704/276 |
| 2014/0176416 | A1* | 6/2014 | Horowitz | H04N 23/611 345/156 |
| 2015/0093094 | A1* | 4/2015 | Choi | G11B 27/10 386/224 |
| 2019/0387171 | A1* | 12/2019 | Juang | H04N 23/62 |
| 2022/0417446 | A1* | 12/2022 | Lee | G11B 27/28 |

* cited by examiner

*Primary Examiner* — Abdelaaziz Tissire
(74) *Attorney, Agent, or Firm* — Esplin & Associates, PC

(57) ABSTRACT

An image capture device may capture visual content of a video. During the capture of the video, a user may perform a framing interaction with the image capture device. The framing interaction with the image capture device may provide information/instruction on how the visual content being captured by the image capture device should be framed. The framing interaction with the image capture device may assign a direction of the visual content for framing. The framing interaction performed during the capture of the visual content may be used to frame the visual content after capture.

20 Claims, 9 Drawing Sheets

FRAMING VISUAL CONTENT DURING CAPTURE

FIELD

This disclosure relates to framing visual content during capture by an image capture device.

BACKGROUND

A user may use an image capture device to capture a video. Manually reviewing the video to determine framing of the video may be difficult and time consuming.

SUMMARY

This disclosure relates to framing videos. The image capture device may include a housing. The housing may carry one or more of an optical element, an image sensor, and/or other components. The optical element may guide light within a field of view to the image sensor. The image sensor may generate a visual output signal conveying visual information based on light that becomes incident thereon. The visual information may define visual content.

The visual content may be captured during a capture duration to generate a video. The video may have a progress length. At a moment within the progress length, a framing interaction with the image capture device to frame the visual content may be detected. Framing of the video at the moment within the progress length may be determined based on detection of the framing interaction with the image capture device to frame the visual content and/or other information. The framing of the video may define positioning of a viewing window for the visual content within the video.

A housing may carry one or more components of an image capture device. The housing may carry (be attached to, support, hold, and/or otherwise carry) one or more of an electronic storage, an optical element, an image sensor, a processor, and/or other components.

The electronic storage may store information relating to the image capture device, information relating to components of the image capture device, visual information, information relating to visual content captured by the image capture device, information relating to a video, information relating to framing of the video, information relating to a viewing window, information relating to user interaction with the image capture device, and/or other information.

The optical element may be configured to guide light within a field of view to the image sensor. The field of view may be less than 180 degrees. The field of view may be equal to 180 degrees. The field of view may be greater than 180 degrees.

The image sensor may be configured to generate a visual output signal and/or other output signals based on light that becomes incident thereon and/or other information. The visual output signal may convey visual information and/or other information. The visual information may define visual content having the field of view.

The processor(s) may be configured by machine-readable instructions. Executing the machine-readable instructions may cause the processor(s) to facilitate framing videos. The machine-readable instructions may include one or more computer program components. The computer program components may include one or more of a capture component, a framing interaction component, a frame component, and/or other computer program components.

The capture component may be configured to capture the visual content during a capture duration to generate a video. The video may have a progress length. In some implementations, the visual content may be captured to generate a spherical video.

The framing interaction component may be configured to detect a framing interaction with the image capture device to frame the visual content. The framing interaction with the image capture device to frame the visual content may be detected at a moment within the progress length of the video.

In some implementations, the framing interaction with the image capture device to frame the visual content may include a user interaction with a physical button or a virtual button of the image capture device during the capture duration. In some implementations, the framing interaction with the image capture device to frame the visual content may include a user speaking a voice command during the capture duration. In some implementations, the framing interaction with the image capture device to frame the visual content may include a user making a hand gesture during the capture duration.

The frame component may be configured to determine framing of the video at the moment within the progress length. The framing of the video at the moment within the progress length may be determined based on detection of the framing interaction with the image capture device to frame the visual content and/or other information. The framing of the video may define positioning of a viewing window for the visual content within the video.

In some implementations, determination of the framing of the video at the moment within the progress length may include determination of a viewing direction for the viewing window at the moment within the progress length. In some implementations, the determination of the framing of the video at the moment within the progress length may further include determination of a viewing size for the viewing window at the moment within the progress length.

In some implementations, the framing of the video at the moment within the progress length may be determined further based on direction in which the voice command to frame the visual content is received by the image capture device. In some implementations, the framing of the video at the moment within the progress length may be determined further based on object detection. In some implementations, framing of the video at other moments within the progress length may be determined based on object tracking.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
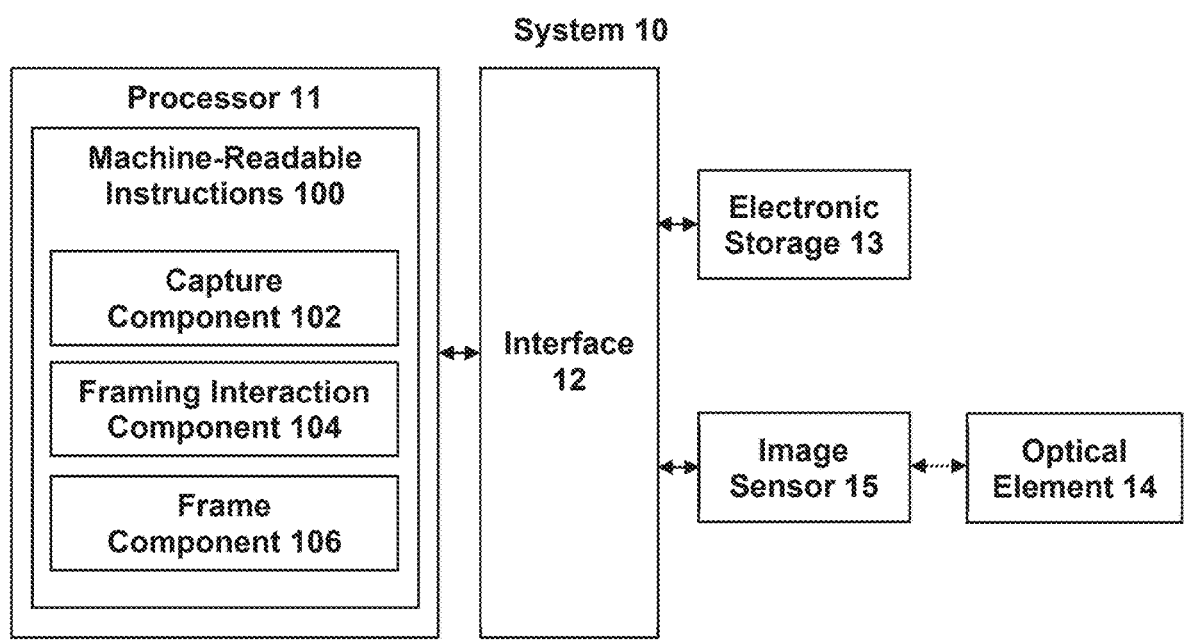
FIG. 1 illustrates an example system for framing videos.

FIG. 1 illustrates a system 10 for framing videos. The system 10 may include one or more of a processor 11, an interface 12 (e.g., bus, wireless interface), an electronic storage 13, an optical element 14, an image sensor 15, and/or other components. The optical element 14 may guide light within a field of view to the image sensor 15. The image sensor 15 may generate a visual output signal conveying visual information based on light that becomes incident thereon. The visual information may define visual content. The visual content may be captured by the processor 11 during a capture duration to generate a video. The video may have a progress length. At a moment within the progress length, a framing interaction with the image capture device to frame the visual content may be detected by the processor 11. Framing of the video at the moment within the progress length may be determined by the processor 11 based on detection of the framing interaction with the image capture device to frame the visual content and/or other information. The framing of the video may define positioning of a viewing window for the visual content within the video.

The system 10 may include and/or be part of an image capture device. The image capture device may include a housing, and one or more of the electronic storage 13, the optical element 14, the image sensor 15, and/or other components of the system 10 may be carried by the housing of the image capture device. The image capture device may capture a video (e.g., visual content of the video, audio content of the video). During capture of the video, a user may interact with the image capture device, such as by making a hand gesture, by speaking a voice command, by pressing buttons, and/or by engaging a touchscreen. The user interaction with the image capture device during video capture may indicate that the video should be framed in a particular way. The user interaction with the image capture device during video capture may be used to frame the video. The user interaction with the image capture device may be used to determine which spatial extents and/or which temporal parts of the video should be presented. The image capture device and/or another computing device (e.g., mobile device, desktop device) may use the user interaction with the image capture device during video capture to frame the video.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to the image capture device, information relating to components of the image capture device, visual information, information relating to visual content captured by the image capture device, information relating to a video, information relating to framing of the video, information relating to a viewing window, information relating to user interaction with the image capture device, and/or other information.

Visual content may refer to content of image(s), video frame(s), and/or video(s) that may be consumed visually. For example, visual content may be included within one or more images and/or one or more video frames of a video. The video frame(s) may define/contain the visual content of the video. The video may include video frame(s) that define/contain the visual content of the video. Video frame(s) may define/contain visual content viewable as a function of progress through the progress length of the video. A video frame may include an image of the video at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. Visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of the image capture device, microphone(s) coupled to the image capture device) and/or may be captured by one or more sound sensors separate from the image capture device (e.g., microphone(s) separate from the image capture device).

The sound(s) within the audio content may correspond to the sound(s) that were captured when capturing the visual content. For example, the visual content may include a visual capture of an activity involving one or more persons and the audio content may include sound capture of the activity, which may include sounds produced by persons or non-persons (e.g., animals, machines, objects). One or more portions of the audio content may include capture of voice of one or more persons and/or other sounds. Voice may refer to vocal sounds made by a person. Voice may be directed to one or more persons or one or more non-persons. Voice may include part of a spoken word/sound, one or more spoken words/sounds, and/or other vocal sounds. For example, voice may include speech, singing, shouting, cheering, yelling, screaming, booing, and/or other types of voice.

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored within one or more audio tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the electronic storage 13, the optical element 14, and/or the image sensor 15, of the system 10 may be carried by the housing of the image capture device. The housing of the image capture device may carry other components of the system 10, such as the processor 11. References to the housing of an image capture device may refer to the image capture device, and vice versa.

An image capture device may refer to a device that captures visual content. An image capture device may capture visual content in the form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet).

Figure 3:
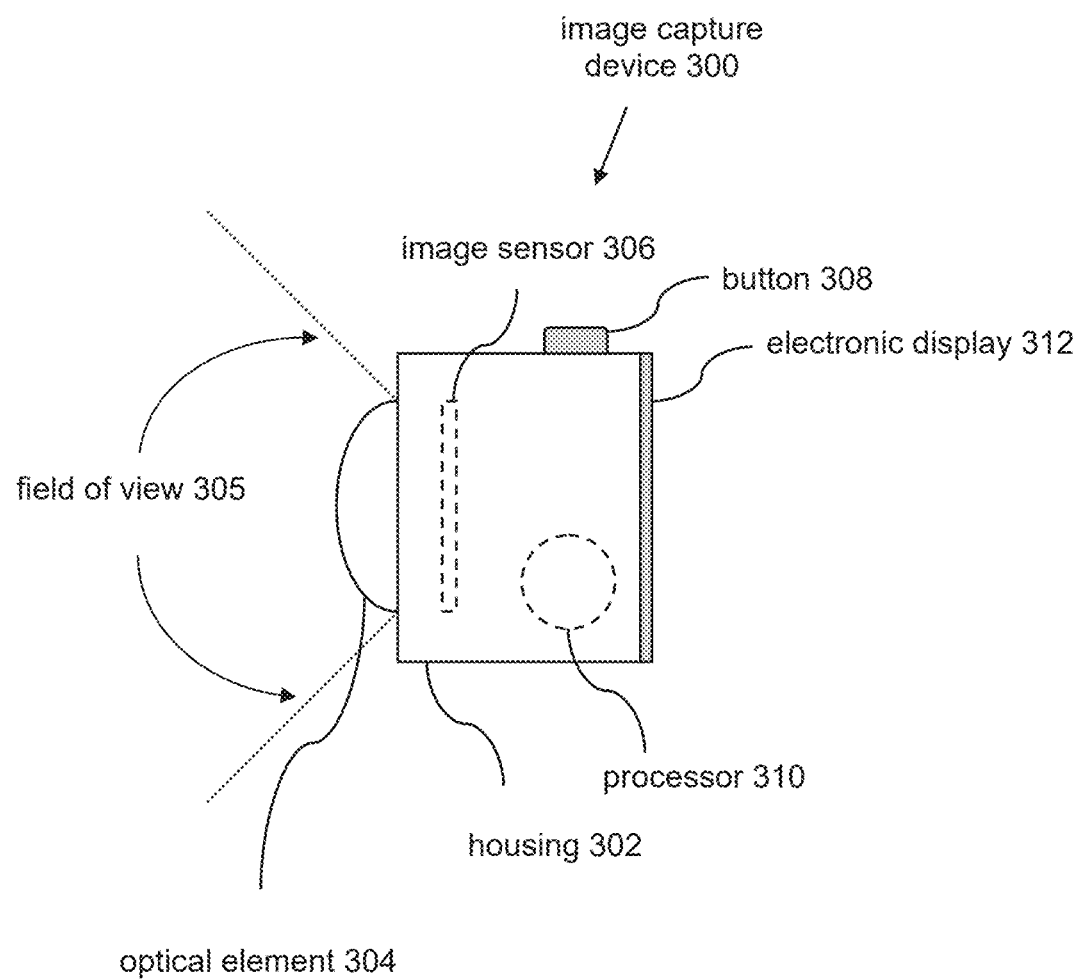
FIG. 3 illustrates an example image capture device.

FIG. 3 illustrates an example image capture device 300. Visual content (e.g., of image(s), video frame(s)), audio content, metadata relating to the visual content and/or audio content, and/or other content may be captured by the image capture device 300. The image capture device 300 may include a housing 302. The housing 302 may refer a device (e.g., casing, shell) that covers, protects, and/or supports one or more components of the image capture device 300. The housing 302 may include a single-piece housing or a multi-piece housing. The housing 302 may carry one or more components of the image capture device 300. The housing 302 may carry (be attached to, support, hold, and/or otherwise carry) one or more of an optical element 304, an image sensor 306, a button 308, a processor 310, an electronic display 312, and/or other components.

One or more components of the image capture device 300 may be the same as, be similar to, and/or correspond to one or more components of the system 10. For example, the processor 310 may be the same as, be similar to, and/or correspond to the processor 11. The optical element 304 may be the same as, be similar to, and/or correspond to the optical element 14. The image sensor 306 may be the same as, be similar to, and/or correspond to the image sensor 15. The image capture device 300 may include other components not shown in FIG. 3. The image capture device 300 may not include one or more components shown in FIG. 3. For example, an image capture device may include multiple electronic displays (e.g., front-facing electronic display, back-facing electronic display). An image capture device may include multiple optical elements and multiple image sensors. An image capture device may include one or more sound sensors. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 300 may include multiple optical elements. For example, the image capture device 300 may include multiple optical elements that are arranged on the housing 302 to capture spherical images/videos (guide light within spherical field of view to one or more images sensors). For instance, the image capture device 300 may include two optical elements positioned on opposing sides of the housing 302. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured to generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating image content (e.g., content of image(s) and/or video content (e.g., content of video frames). For example, during a capture duration, the visual output signal generated by the image sensor 306 and/or the visual information conveyed by the visual output signal may be used to record, store, and/or otherwise capture the visual content for use in generating video content.

The image capture device 300 may include multiple image sensors. For example, the image capture device 300 may include multiple image sensors carried by the housing 302 to capture spherical images/videos based on light guided thereto by multiple optical elements. For instance, the image capture device 300 may include two image sensors configured to receive light from two optical elements positioned on opposing sides of the housing 302. The fields of views of the optical elements may overlap and enable capture of spherical images and/or spherical videos.

The image capture device 300 may include other sensors. For example, the image capture device 300 may include one or more sound sensors to capture audio content. A sound sensor may include sensor(s) (e.g., microphone, component(s) of microphone) that converts received sounds into output signals. The output signals may include electrical signals. The sound sensor may generate output signals conveying information based on sounds received by the sound sensor. For example, the sound sensor may be configured to generate an audio output signal conveying audio information based on the sounds received by the sound sensor. The audio information may define audio content. The audio information may define audio content by including information that defines one or more content, qualities, attributes, features, and/or other aspects of the audio content. For example, the audio information may define audio content by including information that makes up the content of the audio, and/or information that is used to determine the content of the audio. The audio content may include one or more reproductions of the received sounds. The audio information may define audio content in one or more formats, such as WAV, MP3, MP4, RAW, and/or other formats.

The image capture device 300 may include multiple audio sensors. The image capture device 300 may use the multiple audio sensors to capture spatial audio content. The image capture device 300 may use the multiple audio sensors to determine the direction from which sound is received by the image capture device (e.g., audio direction of arrival).

The image capture device 300 may include one or more location sensors (e.g., GPS sensors) to measure location of the image capture device and/or one or more position sensors (e.g., gyroscope, accelerometer, inertial measurement unit) to measure position, movement, and/or orientation of the image capture device. In some implementations, information about location, position, and/or movement of the image capture device may be stored as metadata of other content (e.g., visual content, audio content) captured by the image capture device.

The button 308 may refer to one or more physical mechanisms that may be physically interacted upon by a user. The button 308 may be interacted upon by a user to operate the button 308 and provide one or more commands to the image capture device 300. For example, a user may interact with the button 308 to provide one or more commands to the image capture device 300 to start content capture, to stop content capture, to frame the visual content, and/or to otherwise operate the image capture device 300. In some implementations, the button 308 may include a dedicated button with the user interaction of the button 308 causing specific operation/functionality (e.g., start/stop record, power on/off). In some implementations, the button 308 may include a multi-purpose button with the user interaction of the button 308 causing different operations/functionalities (e.g., based on different context in which the image capture device 300 is operating, based on user specifying the use of the button 308).

The button 308 may be configured to be interacted upon by a user of the image capture device. The button 308 may be configured to be interacted upon by the user during capture of content by the image capture device. The button 308 may be configured to receive different types of user interaction. A type of user interaction may refer to a category, a way, a form, and/or kind of user interaction. Different types of user interaction may be defined by different physical interactions of the user with the button 308 (e.g., press, pull, twist, flip, click, press-and-hold), different timing of physical interaction of the user with the button 308 (e.g., a short-press, a long press, a combination/sequence of button presses), and/or other user interaction with the button 308.

While a single physical button is shown in FIG. 3, this is merely as an example and is not meant to be limiting. In some implementations, the image capture device 300 may include multiple physical buttons. In some implementations, the function of the button 308 may be performed by a virtual button presented on the electronic display 312. Other types and/or configurations of buttons are contemplated.

The electronic display 312 may include an electronic device that provides visual presentation of information. The electronic display 312 may include a color display and/or a non-color display. The electronic display 312 may be configured to visually present information. The electronic display 312 may be configured to present visual content, user interface, and/or other information. User interface (graphical user interface) may include a graphical form that enables a user to interact with the image capture device 300 and/or see information provided by the image capture device 300. A button presented on the electronic display 312 may be referred to as a virtual button.

The electronic display 312 may include one or more touchscreen displays. The electronic display 312 may be configured to receive user input via a user's engagement with the electronic display 312. A user may engage with the electronic display 312 via interaction with one or more touch-sensitive surfaces/screens and/or other components of the electronic display 312. The electronic display 312 may be configured to receive user input to control the operation of the image capture device (e.g., change setting, start recording, stop recording, frame visual content). For example, the electronic display 312 may present one or more options for a user to provide input to the image capture device 300, such as by presenting one or more virtual (soft) buttons. The user may control the operation of the image capture device 300 by engaging one or more fingers on the location of the electronic display 312 corresponding to the virtual button(s). The electronic display 312 may be configured to generate output signals indicating location of the user's engagement with the electronic display 312. User input (to control the operation of the image capture device) may be received/determined based on the output signals generated by the electronic display 312.

The electronic display 312 may include one or more touch-sensitive screens and/or other components. A user may engage with the electronic display 312 by touching one or more portions of a touch-sensitive screen (e.g., with one or more fingers, stylus). A user may engage with the electronic display 312 at a moment in time, at multiple moments in time, during a period, and/or during multiple periods. For example, a user may tap on, hold, or move along the electronic display 312 to provide input to the image capture device. For example, a user may tap on and/or hold a finger on a portion of the electronic display 312 corresponding to a virtual button to provide input to the image capture device.

A processor may include one or more processors (logic circuitry) that provide information processing capabilities in the image capture device. The processor may provide one or more computing functions for the image capture device. The processor may operate/send command signals to one or more components of the image capture device to operate the image capture device. For example, referring to FIG. 3, the processor 310 may facilitate operation of the image capture device 300 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or facilitate transfer of information from the image sensor 306 to another device/component. The processor 310 may obtain information from other sensor(s) and/or facilitate transfer of information from other sensor(s) to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

A video with a wide field of view (e.g., spherical video, panoramic video) may be captured by the image capture device 300. A video with a wide field of view may depict a large portion of a scene. The wide field of view of the video may make it difficult for a user to see every spatial extent of the scene depicted within the video at once. A user may wish to extract particular spatial extents of the video for presentation and/or to create a two-dimensional video. Manually reviewing the footage to identify moments in the video to include in presentation/2D video and to identify which spatial extents of the video to include in the presentation/2D video may be difficult and time consuming.

The present disclosure enables a user to provide information to the image capture device 300 during video capture on how the video being captured by the image capture device 300 should be framed. For example, the user may interact with the image capture device 300 by making a hand gesture, by speaking a voice command, by pressing buttons (e.g., the button 308, a virtual button on the electronic display 312), and/or by engaging the touchscreen of the electronic display 312. User interaction with the image capture device 300 may provide information/instruction on how the video being captured should be framed (e.g., for presentation, for inclusion in a 2D video). User interaction with the image capture device 300 that provides information/instruction on how the video being captured should be framed may be referred to as framing interaction.

Different user interaction (different framing interaction) with the image capture device 300 may provide different information/instruction on how the video being captured should be framed. The user may interact with the image capture device 300 during video capture to assign where important directions/things are located in the video (e.g., spherical video) being captured. The user-assigned directions/locations of things may be used to reframe the video for presentation and/or generation of a video clip (e.g., 2D video, video summary, video edit). When a framing interaction is made, information on the direction (e.g., pan, tilt, roll) in which the video should be framed may be extracted/determined from the framing interaction and saved for use in framing the video. Other information may be extracted/determined from the framing interaction and saved for use in framing the video. For example, when a framing interaction is made, the size of the field of view of the video to be included in the framing of the video, an object to be tracked for inclusion in the framing of the video, and/or other information relating to framing of the video may be extracted/determined from the framing interaction and saved for use in framing the video.

For example, framing interaction with the image capture device 300 may include the user making a hand gesture. A hand gesture may refer to a particular way in which a hand is moved and/or a particular shape/form made with the hand. A specific hand gesture may provide specific information/instruction on how the video being captured should be framed. Different hand gestures may provide different information/instruction on how the video being captured should be framed. For example, a hand gesture may provide information/instruction that the video being captured at that moment should be framed in a particular direction (e.g., framed to be pointed/include the person making the hand gesture, framed to be pointed in a direction relative to the person making the hand gesture, such to the front, right, left, above, or below the person making the hand gesture). A hand gesture may provide information/instruction that the video being captured at subsequent moments should be framed in a particular direction (e.g., track the person making the hand gesture, track a direction relative to the person making the hand gesture, such to the front, right, left, above or below the person that made the hand gesture). A hand gesture may provide information/instruction that framing of the video being captured should stop tracking. A hand gesture may provide information/instruction that the video being captured should be framed in a particular way at a moment in the video, that tracking should be initiated for framing, or that the tracking should be stopped for framing.

A hand gesture may be detected based on analysis of the visual content captured by the image capture device 300. For example, a hand gesture may be detected based on object detection/recognition performed on the visual content captured by the image capture device 300 (e.g., hand gesture detection performed on the visual content mapped using equirectangular projection). The direction of the hand gesture in the visual content may be used to determine the direction in which the visual content should be framed.

As another example, framing interaction with the image capture device 300 may include the user speaking a voice command. A voice command may refer to one or more words, one or more phases, and/or one or more sentences associated with particular operation by the image capture device 300. A specific voice command may provide specific information/instruction on how the video being captured should be framed. Different voice commands may provide different information/instruction on how the video being captured should be framed. For example, a voice command may provide information/instruction that the video being captured at that moment should be framed in a particular direction (e.g., framed to be pointed/include the person that spoke the voice command, framed to be pointed in a direction relative to the person that spoke the voice command, such to the front, right, left, above, or below the person that spoke the voice command). A voice command may provide information/instruction that the video being captured at subsequent moments should be framed in a particular direction (e.g., track the person that spoke the voice command, track a direction relative to the person that spoke the voice command, such to the front, right, left, above, or below the person that spoke the voice command). A voice command may provide information/instruction that framing of the video being captured should stop tracking. A voice command may provide information/instruction that the video being captured should be framed in a particular way at a moment in the video, that tracking should be initiated for framing, or that the tracking should be stopped for framing.

A voice command may be detected based on analysis of the audio content captured by the image capture device 300. For example, a voice command may be detected based on speech recognition performed on the audio content captured by the image capture device 300. The direction in which the voice command was received by the image capture device 300 (direction of audio arrival) may be used to determine the direction in which the visual content should be framed.

As another example, framing interaction with the image capture device 300 may include the user pressing button(s) of the image capture device 300 and/or engaging the touchscreen of the electronic display 312. A specific button press/touchscreen engagement may provide specific information/instruction on how the video being captured should be framed. Different button presses/touchscreen engagements may provide different information/instruction on how the video being captured should be framed. For example, a button press/touchscreen engagement may provide information/instruction that the video being captured at that moment should be framed in a particular. A button press/touchscreen engagement may provide information/instruction that the video being captured at subsequent moments should be framed in a particular direction. A button press/touchscreen engagement may provide information/instruction that framing of the video being captured should stop tracking. A button press/touchscreen engagement may provide information/instruction that the video being captured should be framed in a particular way at a moment in the video, that tracking should be initiated for framing, or that the tracking should be stopped for framing.

For instance, a preview of the visual content being captured by the image capture device 300 may be presented on the electronic display 312. A user may assign a particular direction to frame the visual content by touching a portion of the electronic display 312 (finger tapping a part of the electronic display 312). The direction of the visual content corresponding to the portion of the electronic display 312 touched by the user may be assigned for framing the visual content for that moment in the video. A user may assign a particular field of view size to framing the visual content by touching multiple portions of the electronic display 312 (fingers tapping/tracing two parts of the electronic display 312). The size of the field of view corresponding to the distance between the portions touched by the user may be assigned for framing the visual content for that moment in the video.

A user may assign tracking to frame the visual content by continuously touching one or more portions of the electronic display 312 (finger held on a part of the electronic display 312). The direction of the visual content corresponding to the portion of the electronic display 312 continuously touched by the user may be assigned for framing the visual content for a duration in the video. A user may assign a particular field of view size to framing the visual content by continuously touching multiple portions of the electronic display 312 (fingers held on two parts of the electronic display 312). The size of the field of view corresponding to the distance between the portions continuously touched by the user may be assigned for framing the visual content for a duration in the video.

Figure 4A:
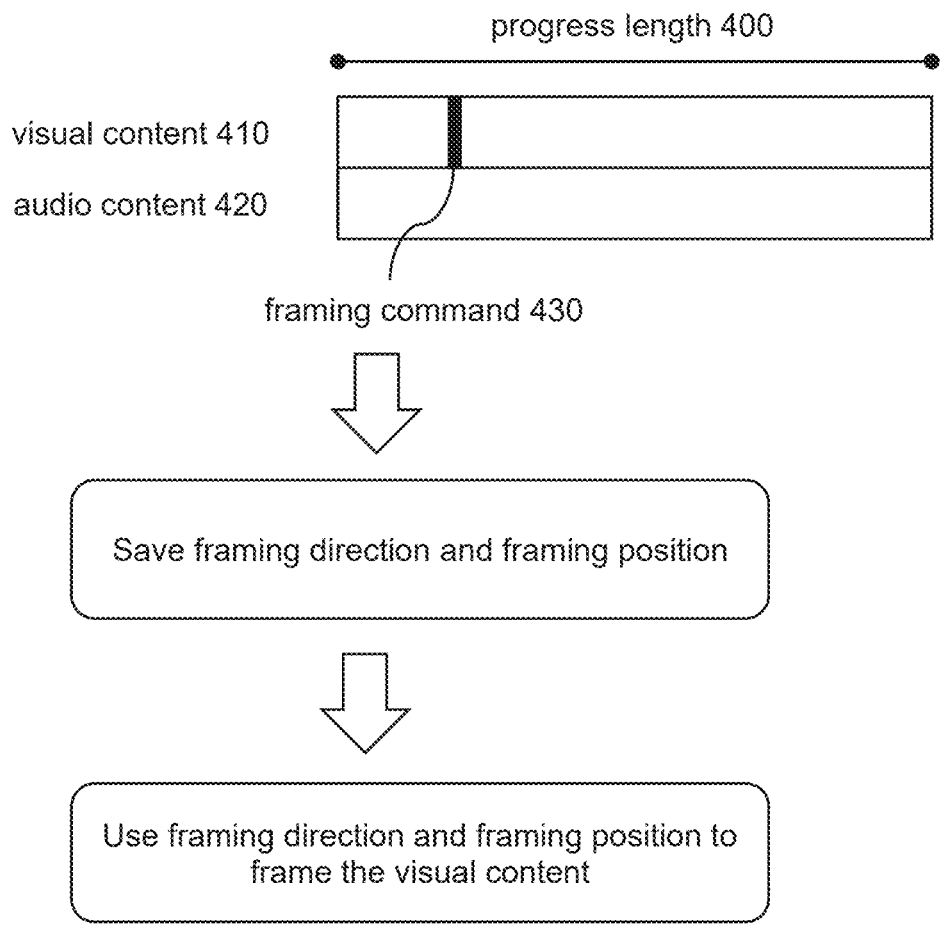
FIG. 4A illustrates an example workflow for framing videos.

FIG. 4A illustrates an example workflow for framing videos. A video may be captured by an image capture device. A video may have a progress length 400. A video may include visual content 410 and audio content 420. A framing command 430 may be received by the image capture device during capture of the video. The framing command 430 may be visually received by the image capture device during capture of the video. For example, the framing command 430 may include a user making a hand gesture.

The framing command 430 may assign a direction (e.g., pan, tilt, roll) for use in framing the visual content (framing direction). The framing direction from the framing command 430 may be saved for the moment at which the framing command 430 was received (framing position). The framing direction and the framing position may be used to frame the visual content 410. The framing direction may be used to determine how the video frame at the framing position (e.g., frame number, a point in time in the video) should be framed for presentation and/or generation of a video clip (e.g., 2D video). The framing position may be used as a highlight moment in the video for inclusion in a video clip (video summary/video edit).

Figure 4B:
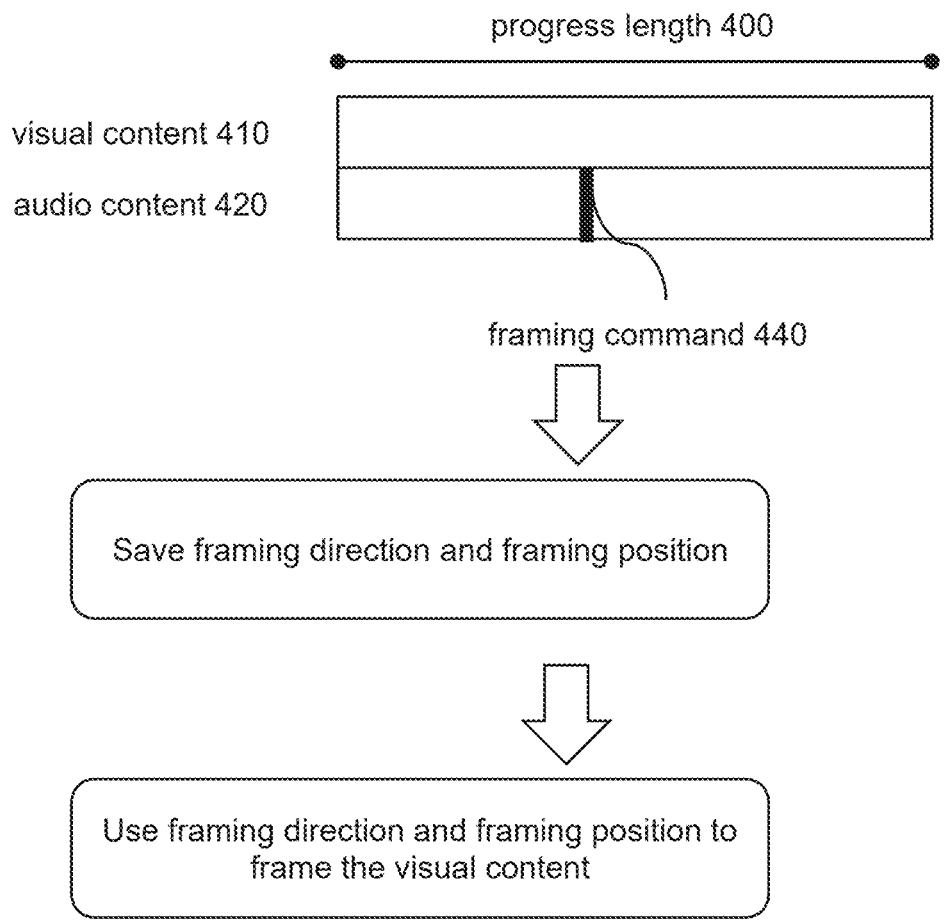
FIG. 4B illustrates an example workflow for framing videos.

FIG. 4B illustrates an example workflow for framing videos. A framing command 440 may be received by the image capture device during capture of the video. The framing command 440 may be audibly received by the image capture device during capture of the video. For example, the framing command 440 may include a user speaking a voice command.

The framing command 440 may assign a direction (e.g., pan, tilt, roll) for use in framing the visual content (framing direction). The framing direction from the framing command 440 may be saved for the moment at which the framing command 440 was received (framing position). The framing direction and the framing position may be used to frame the visual content 410. The framing direction may be used to determine how the video frame at the framing position (e.g., frame number, a point in time in the video) should be framed for presentation and/or generation of a video clip (e.g., 2D video). The framing position may be used as a highlight moment in the video for inclusion in a video clip (video summary/video edit).

Figure 5A:
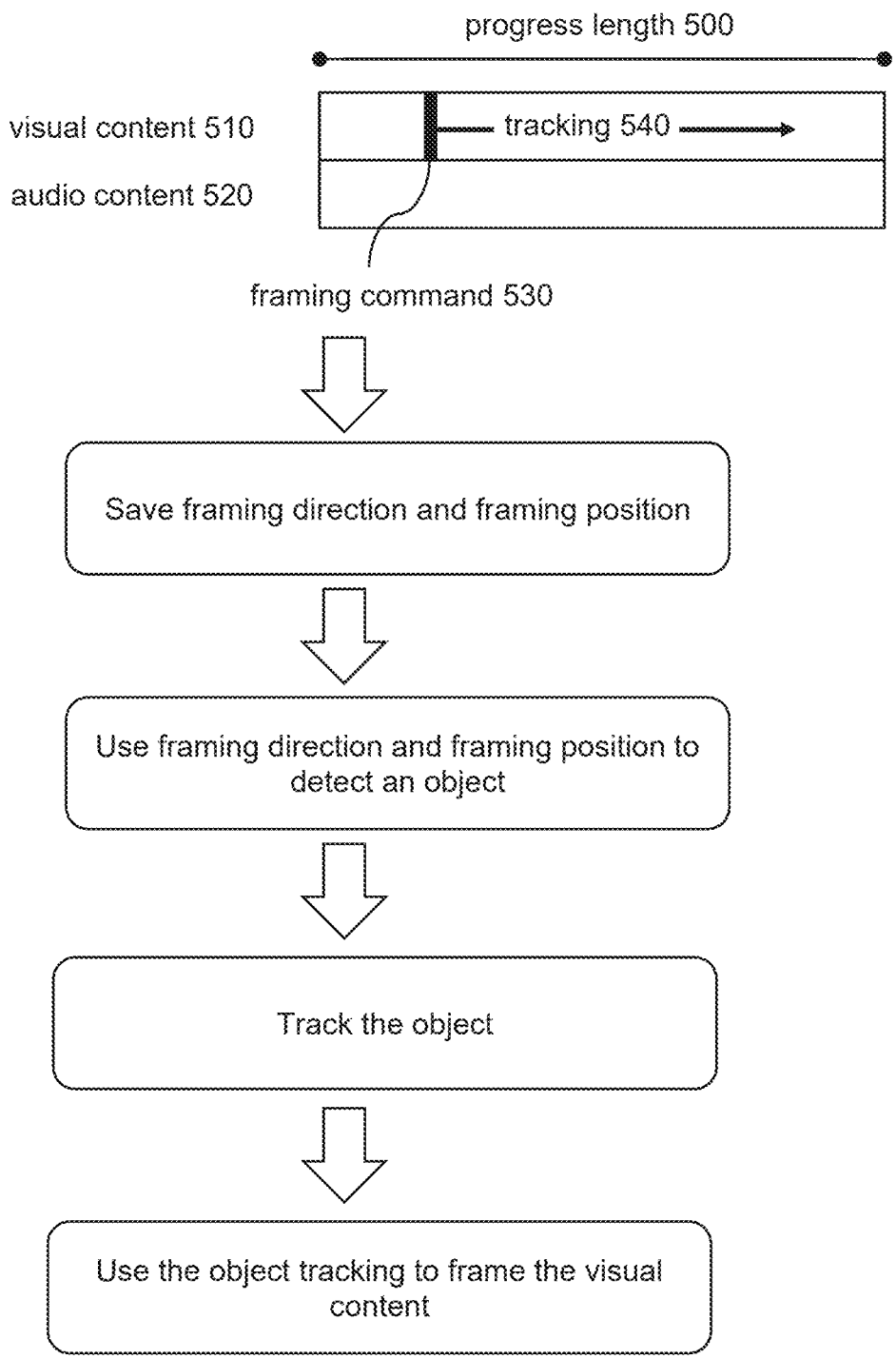
FIG. 5A illustrates an example workflow for framing videos.

FIG. 5A illustrates an example workflow for framing videos. A video may be captured by an image capture device. A video may have a progress length 500. A video may include visual content 510 and audio content 520. A framing command 530 may be received by the image capture device during capture of the video. The framing command 450 may be visually received by the image capture device during capture of the video. For example, the framing command 450 may include a user making a hand gesture.

The framing command 530 may assign a direction (e.g., pan, tilt, roll) for use in framing the visual content (framing direction). The framing direction from the framing command 530 may be saved for the moment at which the framing command 530 was received (framing position). The framing direction and the framing position may be used to initiate tracking 540 (e.g., object tracking) for use in framing the visual content 510. The object for tracking may be detected based on the framing direction and the framing position. The object may be tracked for a duration in the video. The object may be tracked as one or more bounding boxes. The object tracking may be stopped based on the object no longer being depicted in the video, the framing command 530 setting a duration for tracking and the duration running out, a command being received to stop tracking, and/or other information. The object tracking may be used to determine how the video frames during the tracking 540 should be framed for presentation and/or generation of a video clip (e.g., 2D video). The duration of the object tracking may be used as a highlight moment in the video for inclusion in a video clip (video summary/video edit).

Figure 5B:
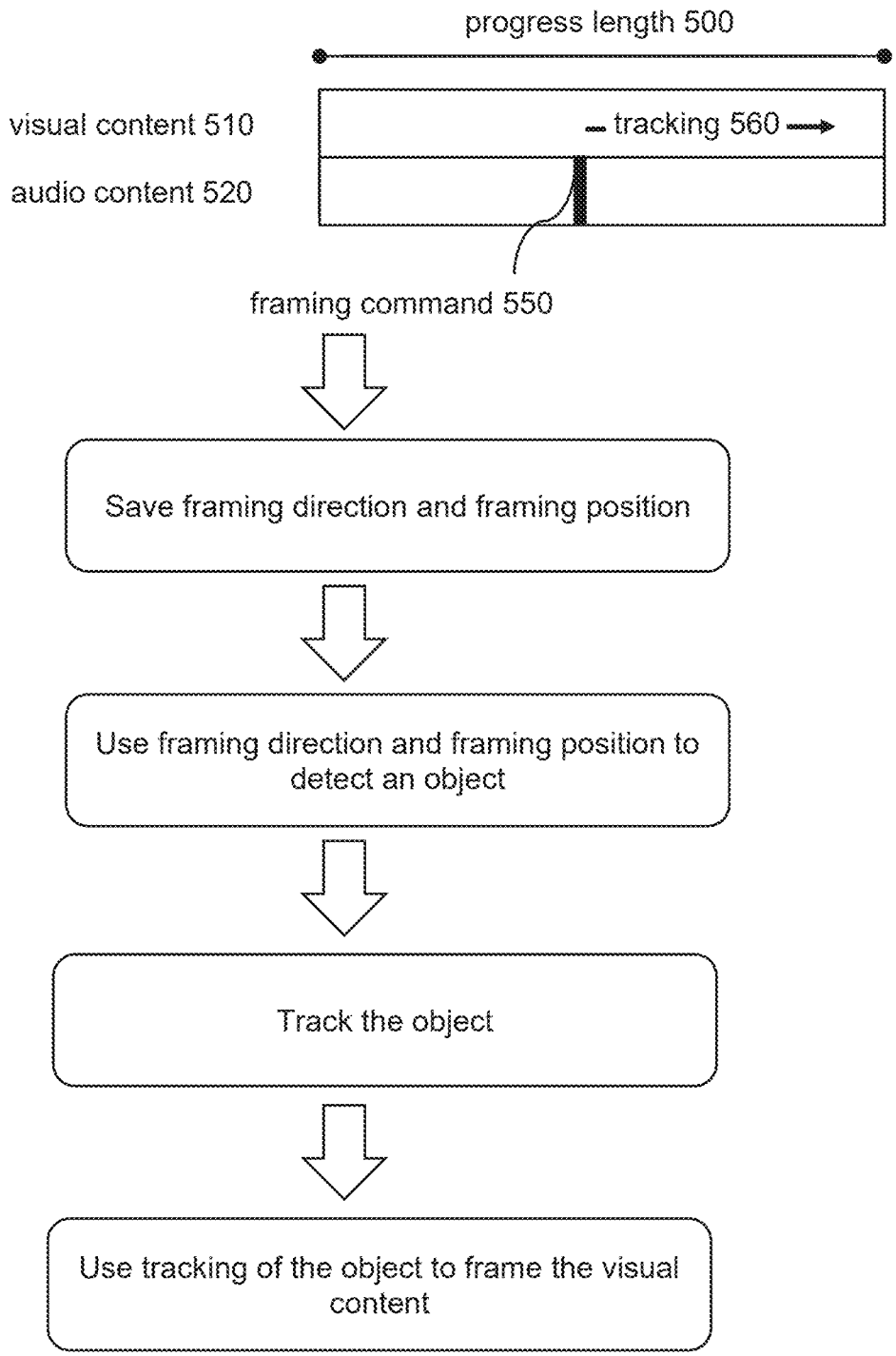
FIG. 5B illustrates an example workflow for framing videos.

FIG. 5B illustrates an example workflow for framing videos. A framing command 550 may be received by the image capture device during capture of the video. The framing command 550 may be audibly received by the image capture device during capture of the video. For example, the framing command 550 may include a user speaking a voice command.

The framing command 550 may assign a direction (e.g., pan, tilt, roll) for use in framing the visual content (framing direction). The framing direction from the framing command 550 may be saved for the moment at which the framing command 550 was received (framing position). The framing direction and the framing position may be used to initiate tracking 560 (e.g., object tracking) for use in framing the visual content 510. The object for tracking may be detected based on the framing direction and the framing position. The object may be tracked for a duration in the video. The object may be tracked as one or more bounding boxes. The object tracking may be stopped based on the object no longer being depicted in the video, the framing command 550 setting a duration for tracking and the duration running out, a command being received to stop tracking, and/or other information. The object tracking may be used to determine how the video frames during the tracking 560 should be framed for presentation and/or generation of a video clip (e.g., 2D video). The duration of the object tracking may be used as a highlight moment in the video for inclusion in a video clip (video summary/video edit).

While single framing commands are shown in FIGS. 4A, 4B, 5A, and 5B, this is merely as examples and is not meant to be limiting. Multiple framing commands may be received during capture of a video.

Figure 6A:
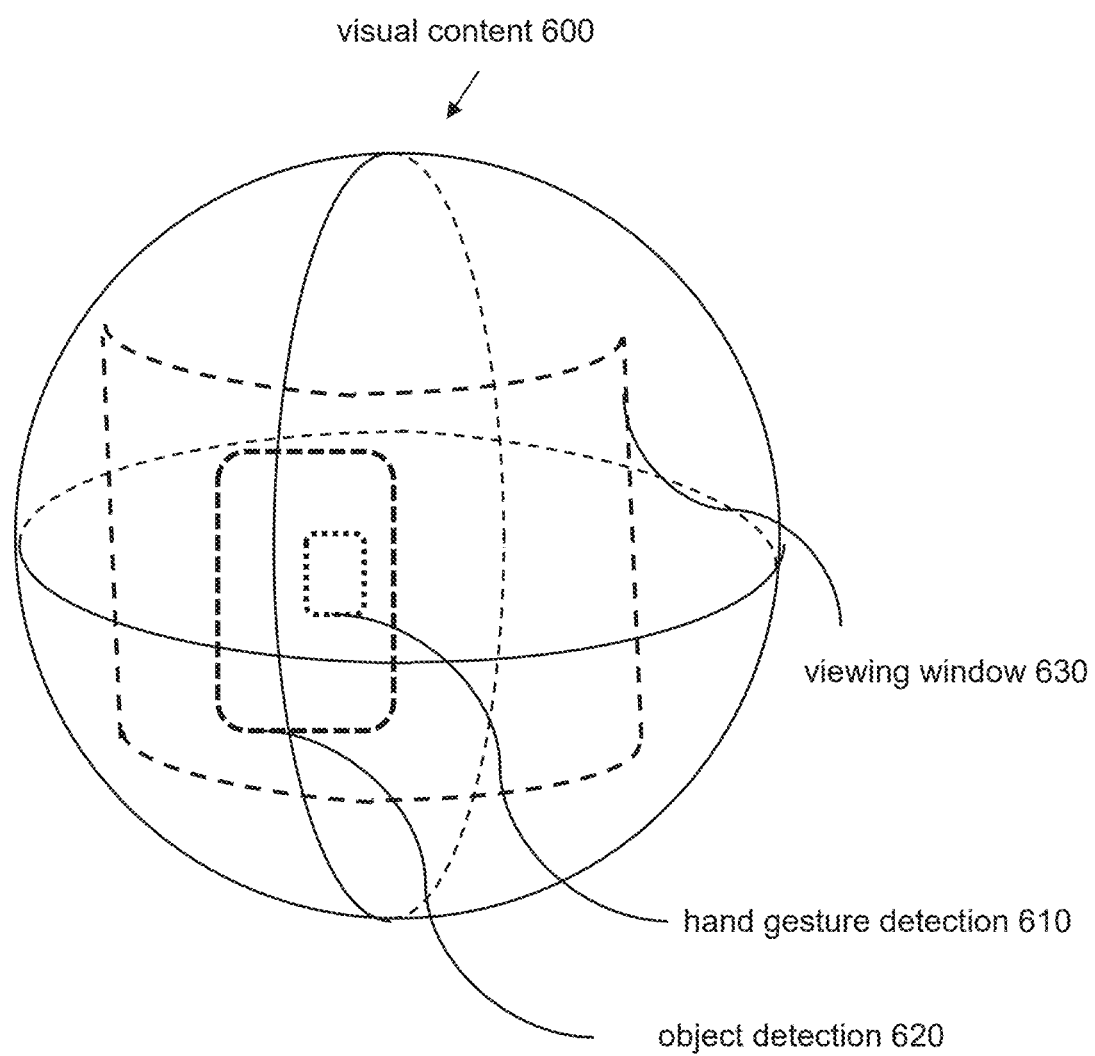
FIG. 6A illustrates an example framing of visual content.

FIG. 6A illustrates an example framing of visual content 600. The visual content 600 may be captured by an image capture device. The visual content 600 may include depiction of a person making a hand gesture. Hand gesture detection 610 may be performed to identify and locate the hand gesture within the visual content 600. In some implementations, the hand gesture detection 610 may be performed with the visual content 600 mapped onto a two dimensional plane using one or more projections (e.g., equirectangular projection). The hand gesture may provide information/instruction on how the visual content 600 should be framed. For example, the hand gesture may instruct the visual content 600 to be framed to include the person making the hand gesture. Object detection 620 may be performed in the direction of the hand gesture to identify the person making the hand gesture. A bounding box may be generated around the person making the hand gesture.

A viewing window 630 may be positioned within the visual content 600. The viewing window 630 may be positioned within the visual content 600 based on the location of the hand gesture, location of the person making the hand gesture, and/or other information. The extent of the visual content 600 within the viewing window 630 may be presented on an electronic display and/or included within a video clip.

Figure 6B:
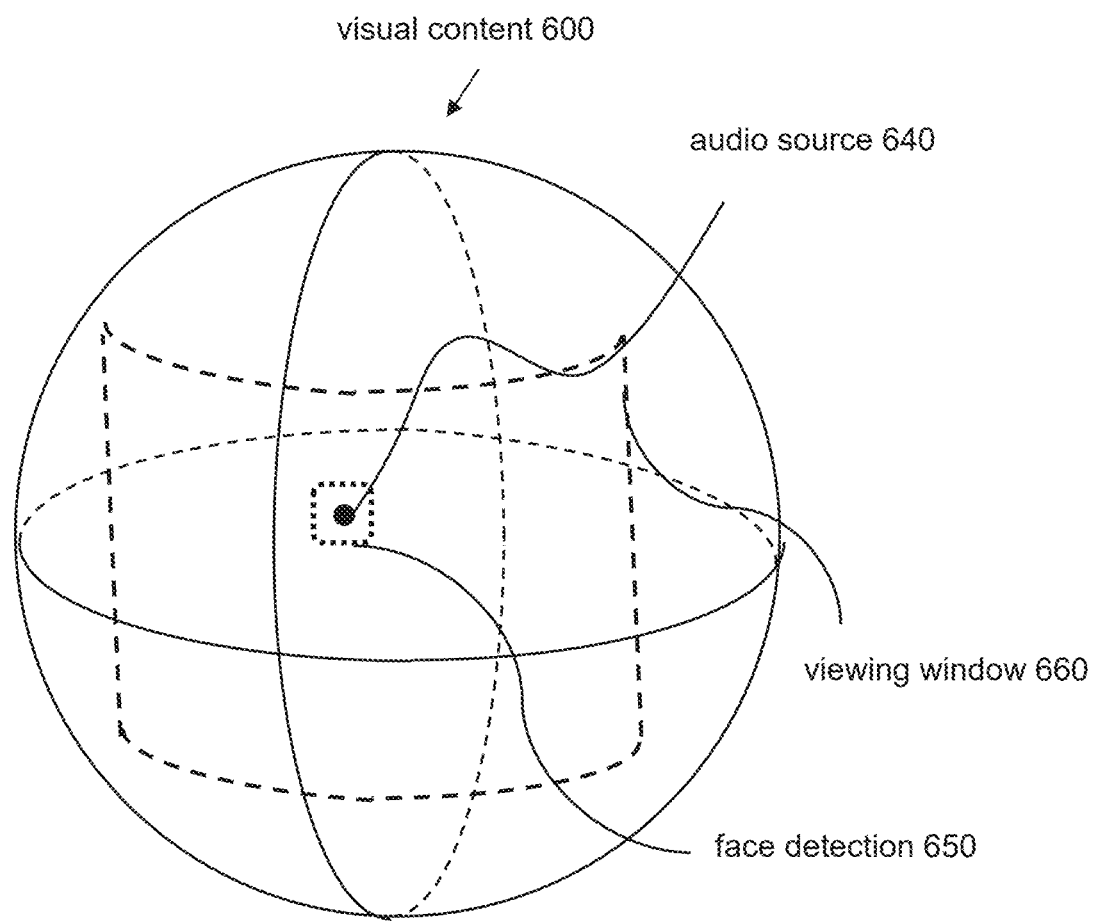
FIG. 6B illustrates an example framing of visual content.

FIG. 6B illustrates an example framing of the visual content 600. During capture of the visual content 600, a voice command may be received from an audio source 640 (e.g., a person). The visual content 600 may include depiction of a person that spoke the voice command. The direction in which the voice command was received by the image capture device may be used to identify and locate the audio source 640. The direction in which the voice command was received by the image capture device may be used to identify and locate the person that spoke the voice command. For example, a face detection 650 may be used to identify and locate a face depicted within the visual content 600 and the direction in which the voice command was received may be matched with the face in the same direction. As another example, the face detection 650 may be performed in the direction in which the voice command was received. A bounding box may be generated around the person that spoke the voice command.

A viewing window 660 may be positioned within the visual content 600. The viewing window 660 may be positioned within the visual content 600 based on the location of the audio source 640, the location of the face of the person that spoke the voice command, the location of the person that spoke the voice command, and/or other information. The extent of the visual content 600 within the viewing window 660 may be presented on an electronic display and/or included within a video clip.

Referring back to FIG. 1, the processor 11 (or one or more components of the processor 11) may be configured to obtain information to facilitate framing videos. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate framing videos. The machine-readable instructions 100 may include one or more computer program components. The machine-readable instructions 100 may include one or more of a capture component 102, a framing interaction component 104, a frame component 106, and/or other computer program components.

The capture component 102 may be configured to capture content (e.g., visual content, audio content, etc.). The capture component 102 may be configured to start capture of content and end capture of content. The capture component 102 may be configured to capture content during a capture duration to generate a video having a progress length. For example, the capture component 102 may be configured to capture visual content based on the visual information conveyed by the visual output signal of one or more image sensors and/or other information. The capture component 102 may be configured to capture audio content based on the audio information conveyed by the audio output signal of one or more sound sensors and/or other information.

Capture of content by the image capture device may include capture of visual content, audio content, and/or other content by the image capture device. Capturing content may include recording, storing, and/or otherwise capturing the content for use in generating image(s), video(s), sound clip(s), and/or other media items. For example, visual content may be captured for use in generating images and/or video frames, and audio content may be captured to provide audio/sound for the images and/or the video frames. Metadata may be captured to provide information about the visual content and/or the audio content.

In some implementations, the visual content may be captured to generate a spherical video. The visual content captured through separate optical elements (e.g., lenses) may be combined/stitched to generate visual content of a spherical video. The visual content of a spherical video may have a spherical field of view.

Information defining captured content may be stored in the electronic storage 13. For example, visual information defining visual content, audio information defining audio content, and/or video information defining a video may be stored in the electronic storage 13. Information defining captured content may be stored in one or more tracks. For example, visual content/visual information may be stored in one or more visual tracks, audio content/audio information may be stored in one or more audio tracks, and metadata may be stored in one or more metadata tracks of a video.

In some implementations, content of a video captured by the image capture device may be obtained for framing of the video. For example, visual content and audio content of a video may be captured by an image capture device, and the visual information defining the visual content, the audio information defining the audio content, and/or the video information defining the video may be obtained by another computing device (e.g., mobile device, desktop device). The other computing device may use the user interaction with the image capture device during video capture to frame the video.

The framing interaction component 104 may be configured to detect one or more framing interactions with the image capture device to frame the visual content. A framing interaction with an image capture device may refer to user interaction with the image capture device that provides information/instruction on how the visual content of the video being captured by the image capture device should be framed. A framing interaction may be performed by a user during capture of the video by the image capture device. The direction of the visual content assigned for framing by a framing interaction may be referred to as framing direction.

Detecting a framing interaction with an image capture device may include one or more of determining, discerning, discovering, finding, identifying, spotting, and/or otherwise detecting the framing interaction with the image capture device. Detecting a framing interaction with an image capture device may include detecting how the user interacted with the image capture device. Detecting a framing interaction with an image capture device may include detecting types of framing interaction with the image capture device. Different types of framing interaction with the image capture device may provide information/instruction on how the visual content of the video being captured by the image capture device should be framed (e.g., different directions for framing, different sizes of field of view for framing, whether or not an object should be tracked). A framing interaction with an image capture device may be detected based on analysis of the visual content captured by the image capture device, analysis of the audio content captured by the image capture device, analysis of user interaction with physical and/or virtual buttons of the image capture device, analysis of user engagement with a touchscreen of the image capture device, and/or other information.

In some implementations, the framing interaction with the image capture device to frame the visual content may include a user speaking a voice command during the capture duration for the video. In some implementations, the framing interaction with the image capture device to frame the visual content may include a user making a hand gesture during the capture duration for the video. In some implementations, a framing interaction with the image capture device to frame the visual content may include a user interaction with a physical button or a virtual button of the image capture device during the capture duration for the video. In some implementations, a framing interaction with the image capture device to frame the visual content may include a user engagement with a touchscreen display of the image capture device during the capture duration for the video.

A framing interaction with the image capture device to frame the visual content may be detected at a moment (e.g., a point in time, a video frame, duration, a group of adjacent video frames) within the progress length of the video. Separate framing interactions with the image capture device to frame the visual content may be detected at separate moments within the progress length of the video. The moment within the progress length of the video at which a framing interaction is detected may be referred to as framing position.

The frame component 106 may be configured to determine framing of the video at one or more moments within the progress length. Determining framing of the video may include determining framing of the visual content of the video. Determining framing of the video may include ascertaining, calculating, computing, establishing, finding, setting, and/or otherwise determining the framing of the video. Framing of the video may be determined at the moment(s) in which the framing interaction(s) are detected. Framing of the video may be determined at other moment(s) in the video (e.g., a duration following a point at time in which a framing interaction is detected).

The framing of the video may refer to how the visual content of the video is manipulated for presentation and/or included in a video clip. The framing of the video may define positioning of a viewing window for the visual content within the video. The framing of the video may define where and how the viewing window is placed within the field of view of the visual content.

A viewing window may define the extents of the visual content to be included within a presentation of the video and/or included within a video clip. A viewing window may define extents of the visual content to be included within a punchout of the visual content. A punchout of visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial parts of the visual content.

A punchout of visual content may include output of a virtual camera. A virtual camera may define one or more spatial extents of the visual content to be output (e.g., for presentation, for storage) based on orientation of the virtual camera with respect to the visual content of the video. A virtual camera may represent the point of view from which different spatial extents of the visual content are observed. Different punchouts of the visual content may include outputs of different virtual cameras to provide views of differential spatial parts of the visual content.

Positioning of a viewing window within the field of view of the visual content may refer to placement of the viewing window within the field of view of the visual content. The positioning/placement of the viewing window may be defined by one or more of viewing direction, viewing size, viewing rotation, and/or other information. Individual framing of the visual content may define (e.g., determine, establish, include, set) positioning of the viewing window within the field of view of the visual content based on the corresponding viewing direction, viewing size, viewing rotation, and/or other information. An individual framing of the visual content may define arrangement of pixels within the viewing window for presentation. The arrangement of the pixels within the viewing window may be defined by viewing projection and/or other information. Individual framing of the visual content may define corresponding viewing projection of the visual content within the viewing window.

A viewing direction may define a direction of view for a viewing window. A viewing direction may define the angle/visual portion of the visual content at which a viewing window may be directed. A viewing size may define the size of the viewing window. A viewing size may define a size (e.g., size, magnification, viewing angle) of viewable extents of visual content within the viewing window. A viewing size may define the dimension/shape of the viewing window. A viewing rotation may define a rotation of the viewing window. A viewing rotation may define one or more rotations of the viewing window about one or more axis. A viewing projection may define how pixels within the viewing window is arranged for presentation on an electronic display. A viewing projection may define how the pixels of an image are arranged to form the visual content. A viewing projection may refer to how portions of the visual content/pixels are mapped onto a surface (e.g., two-dimensional plane).

The framing of the video at moment(s) within the progress length may be determined based on detection of the framing interaction with the image capture device to frame the visual content and/or other information. Information/instruction provided by the during capture of the video through framing interaction may be used to determine the framing of the visual content. A framing interaction at a moment within the progress length of the video may be used to determine the framing of the visual content at that moment. A framing interaction at a moment within the progress length of the video may be used to determine the framing of the visual content at subsequent moments (e.g., for tracking).

In some implementations, determination of the framing of the video at a moment within the progress length may include determination of a viewing direction for the viewing window at the moment within the progress length. Information/instruction provided by the during capture of the video through framing interaction may be used to determine the framing direction for the visual content. Information/instruction provided by the during capture of the video through framing interaction may be used to determine the direction of placement for the viewing window.

In some implementations, the determination of the framing of the video at the moment within the progress length may further include determination of a viewing size for the viewing window at the moment within the progress length. Information/instruction provided by the during capture of the video through framing interaction may be used to determine how much of the field of view of the visual content will be included within the viewing window.

In some implementations, the framing of the video at the moment within the progress length may be determined further based on direction in which the voice command to frame the visual content is received by the image capture device. The direction of arrival of the voice command may be determined and used to determine the framing of the video. For example, the framing of the video may be determined to include the source of the voice command, the face of the person that spoke the voice command, the body of the person that spoke the voice command, or the scenery around the person that spoke the voice command.

In some implementations, the framing of the video at the moment within the progress length may be determined further based on object detection. Object detection may be performed to identify a target of the framing interaction. For example, an object detection may be performed in the framing direction of the framing interaction. The framing of the video may be determined to include the detected object. The framing of the video may be determined based on one or more bounding boxes around the detected object.

In some implementations, framing of the video at other moments within the progress length may be determined based on object tracking. An object detected within the visual content may be tracked across a duration in the video. The framing of the video may be determined to include the detected object across the duration in the video. The framing of the video for the duration may be determined based on one or more bounding boxes around the detected object.

The framing of the video may be used to generate a presentation of the video. The visual content of the video within the viewing window may be presented on one or more electronic displays. The visual content of the video within the viewing window may be used to generate a video clip (e.g., 2D video, video summary, video edit). The video clip may be stored in the electronic storage 13.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the implementations of the disclosure are described with respect to the system 10, this is merely as an example and is not meant to be limiting. In some implementation, some or all of the functionalities attributed herein to the system 10 may be performed by another system, one or more computing devices, and/or one or more processing apparatuses (e.g., tangible hardware/equipment that processes information). In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13 and the image sensor 15 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
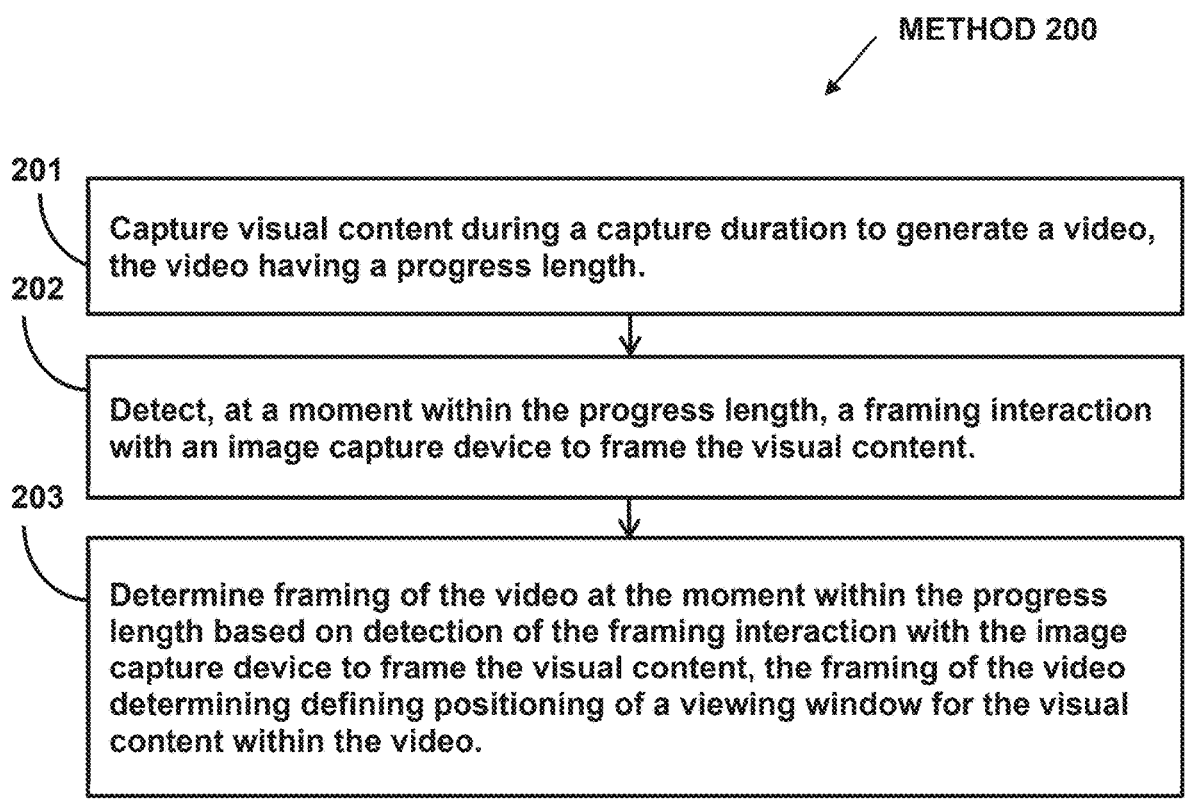
FIG. 2 illustrates an example method for framing videos.

FIG. 2 illustrates method 200 for framing videos. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may carry one or more of an optical element, an image sensor, and/or other components. The optical element may guide light within a field of view to the image sensor. The image sensor may generate a visual output signal conveying visual information based on light that becomes incident thereon. The visual information may define visual content.

At operation 201, the visual content may be captured during a capture duration to generate a video. The video may have a progress length. In some implementations, operation 201 may be performed by a processor component the same as or similar to the capture component 102 (Shown in FIG. 1 and described herein).

At operation 202, at a moment within the progress length, a framing interaction with the image capture device to frame the visual content may be detected. In some implementations, operation 202 may be performed by a processor component the same as or similar to the framing interaction component 104 (Shown in FIG. 1 and described herein).

At operation 203, framing of the video at a moment within the progress length may be determined based on detection of the framing interaction with the image capture device to frame the visual content and/or other information. The framing of the video may define positioning of a viewing window for the visual content within the video. In some implementations, operation 203 may be performed by a processor component the same as or similar to the frame component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for framing videos, the image capture device comprising:
a housing;
an optical element carried by the housing and configured to guide light within a field of view to an image sensor;
the image sensor carried by the housing and configured to generate a visual output signal conveying visual information based on light that becomes incident thereon, the visual information defining visual content; and
one or more physical processors carried by the housing and configured by machine-readable instructions to:
capture the visual content during a capture duration to generate a video, the video having a progress length;
during a moment within the capture duration, detect a framing interaction by a user with the image capture device to frame the visual content, the framing interaction by the user with the image capture device to frame the visual content including the user speaking a voice command or the user making a hand gesture during the capture duration, the framing interaction by the user with the image capture device received from a direction from the image capture device, the direction of the framing interaction including a direction from which the voice command was received by the image capture device or a direction of the hand gestured depicted within the visual content, the moment within the capture duration corresponding to a moment within the progress length of the video;
wherein:
the framing interaction during the capture duration causes performance of object tracking for video framing and determines a direction from which the object tracking is started;
a location of depiction of the user within the visual content at the moment within the progress length of the video is determined based on the direction from which the framing interaction by the user was received by the image capture device during the capture duration;
object tracking is performed to track changes in locations of the depiction of the user within the visual content over a duration after the moment within the progress length of the video; and
framing of the video at the moment within the progress length and over the duration after the moment within the progress length is determined based on the locations of the depiction of the user at the moment within the progress length and over the duration after the moment within the progress length, the framing of the video defining positioning of a viewing window for the visual content within the video.

2. The image capture device of claim 1, wherein determination of the location of depiction of the user within the visual content at the moment within the progress length of the video based on the direction from which the framing interaction by the user was received by the image capture device during the capture duration includes:
performing face detection in the direction from which the voice command was received by the image capture device during the capture duration; or
performing person detection in the direction of the hand gestured depicted within the visual content.

3. An image capture device for framing videos, the image capture device comprising:
a housing;
an optical element carried by the housing and configured to guide light within a field of view to an image sensor;
the image sensor carried by the housing and configured to generate a visual output signal conveying visual information based on light that becomes incident thereon, the visual information defining visual content; and
one or more physical processors carried by the housing and configured by machine-readable instructions to:
capture the visual content during a capture duration to generate a video, the video having a progress length;
during a moment within the capture duration, detect a framing interaction by a user with the image capture device to frame the visual content, the framing interaction by the user with the image capture device received from a direction from the image capture device, the moment within the capture duration corresponding to a moment within the progress length of the video;

wherein:
the framing interaction during the capture duration causes performance of object tracking for video framing and determines a direction from which the object tracking is started;

a location of depiction of the user within the visual content at the moment within the progress length of the video is determined based on the direction from which the framing interaction by the user was received by the image capture device during the capture duration;

object tracking is performed to track changes in locations of the depiction of the user within the visual content over a duration after the moment within the progress length of the video; and framing of the video at the moment within the progress length and over the duration after the moment within the progress length is determined based on the locations of the depiction of the user at the moment within the progress length and over the duration after the moment within the progress length, the framing of the video defining positioning of a viewing window for the visual content within the video.

4. The image capture device of claim 3, wherein the framing interaction with the image capture device to frame the visual content includes the user speaking a voice command during the capture duration, and the direction from which the framing interaction by the user was received by the image capture device includes a direction from which the voice command was received by the image capture device.

5. The image capture device of claim 4, wherein determination of the location of depiction of the user within the visual content at the moment within the progress length of the video based on the direction from which the framing interaction by the user was received by the image capture device during the capture duration includes performing face detection in the direction from which the voice command was received by the image capture device during the capture duration.

6. The image capture device of claim 3, wherein the framing interaction with the image capture device to frame the visual content includes the user making a hand gesture during the capture duration, and the direction from which the framing interaction by the user was received by the image capture device includes a direction of the hand gestured depicted within the visual content.

7. The image capture device of claim 6, wherein determination of the location of depiction of the user within the visual content at the moment within the progress length of the video based on the direction from which the framing interaction by the user was received by the image capture device during the capture duration includes performing person detection in the direction of the hand gestured depicted within the visual content.

8. The image capture device of claim 3, wherein determination of the framing of the video at the moment within the progress length includes determination of a viewing direction for the viewing window at the moment within the progress length.

9. The image capture device of claim 8, wherein the determination of the framing of the video at the moment within the progress length further includes determination of a viewing size for the viewing window at the moment within the progress length.

10. The image capture device of claim 3, wherein the visual content is captured to generate a spherical video.

11. The image capture device of claim 3, wherein:
the locations of depictions of the user within the visual content are determined as bounding boxes positioned within the visual content; and
the viewing window is positioned to include the bounding boxes.

12. A method for framing videos, the method performed by an image capture device including an optical element, an image sensor, and one or more processors, the optical element configured to guide light within a field of view to an image sensor, the image sensor configured to generate a visual output signal conveying visual information based on light that becomes incident thereon, the visual information defining visual content, the method comprising:

capturing the visual content during a capture duration to generate a video, the video having a progress length;

during a moment within the capture duration, detecting a framing interaction by a user with the image capture device to frame the visual content, the framing interaction by the user with the image capture device received from a direction from the image capture device, the moment within the capture duration corresponding to a moment within the progress length of the video;

wherein:
the framing interaction during the capture duration causes performance of object tracking for video framing and determines a direction from which the object tracking is started;

a location of depiction of the user within the visual content at the moment within the progress length of the video is determined based on the direction from which the framing interaction by the user was received by the image capture device during the capture duration;

object tracking is performed to track changes in locations of the depiction of the user within the visual content over a duration after the moment within the progress length of the video; and framing of the video at the moment within the progress length and over the duration after the moment within the progress length is determined based on the locations of the depiction of the user at the moment within the progress length and over the duration after the moment within the progress length, the framing of the video defining positioning of a viewing window for the visual content within the video.

13. The method of claim 12, wherein the framing interaction with the image capture device to frame the visual content includes the user speaking a voice command during the capture duration, and the direction from which the framing interaction by the user was received by the image capture device includes a direction from which the voice command was received by the image capture device.

14. The method of claim 13, wherein determination of the location of depiction of the user within the visual content at the moment within the progress length of the video based on the direction from which the framing interaction by the user was received by the image capture device during the capture duration includes performing face detection in the direction from which the voice command was received by the image capture device during the capture duration.

15. The method of claim 12, wherein the framing interaction with the image capture device to frame the visual content includes the user making a hand gesture during the capture duration, and the direction from which the framing interaction by the user was received by the image capture device includes a direction of the hand gestured depicted within the visual content.

16. The method of claim 15, wherein determination of the location of depiction of the user within the visual content at the moment within the progress length of the video based on the direction from which the framing interaction by the user was received by the image capture device during the capture duration includes performing person detection in the direction of the hand gestured depicted within the visual content.

17. The method of claim 12, wherein determination of the framing of the video at the moment within the progress length includes determination of a viewing direction for the viewing window at the moment within the progress length.

18. The method of claim 17, wherein the determination of the framing of the video at the moment within the progress length further includes determination of a viewing size for the viewing window at the moment within the progress length.

19. The method of claim 12, wherein the visual content is captured to generate a spherical video.

20. The method of claim 12, wherein:
   the locations of depictions of the user within the visual content are determined as bounding boxes positioned within the visual content; and
   the viewing window is positioned to include the bounding boxes.

* * * * *